Figure 1:
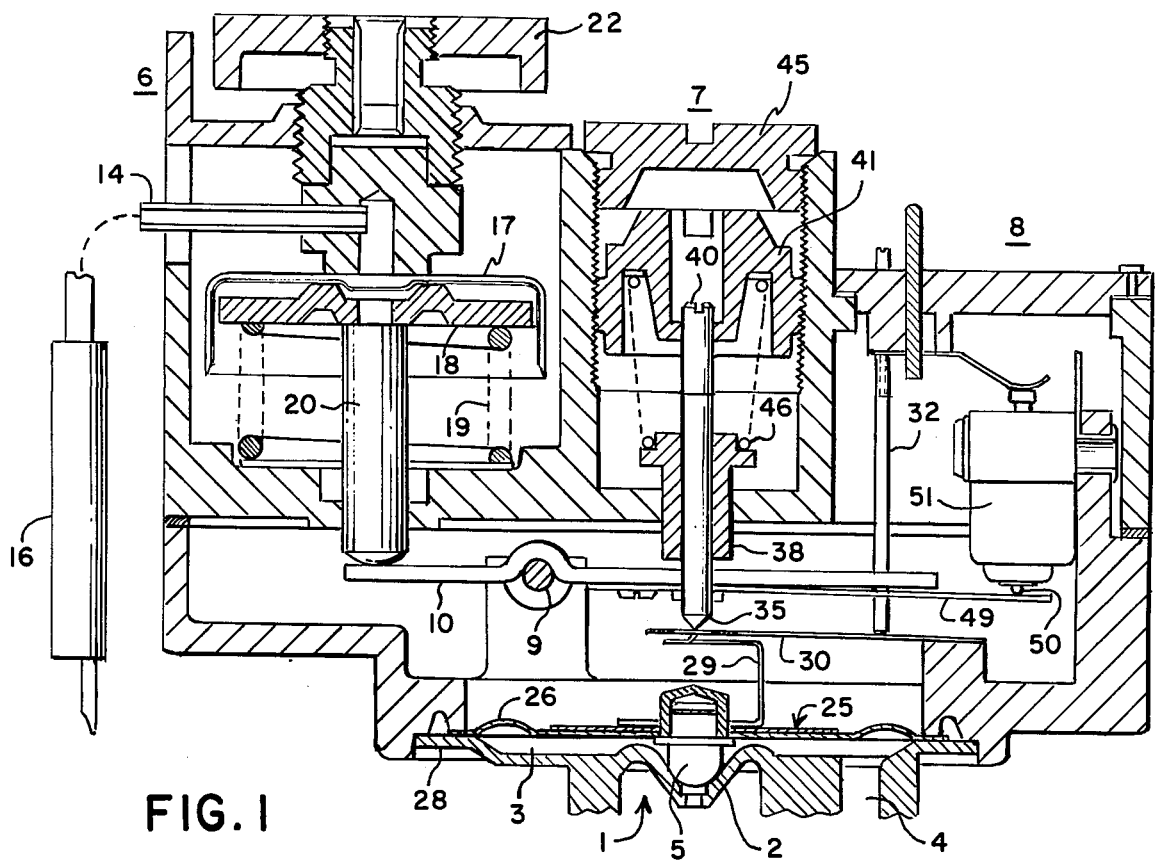

United States Patent [19]
Berkhof

[11] 4,182,488
[45] Jan. 8, 1980

[54] PRESSURE REGULATOR

[75] Inventor: Hendrikus Berkhof, Emmen, Netherlands

[73] Assignee: Honeywell Inc., Minneapolis, Minn.

[21] Appl. No.: 866,071

[22] Filed: Dec. 30, 1977

[51] Int. Cl.² .......................................... G05D 27/00
[52] U.S. Cl. ..................................... 236/92 A; 251/78
[58] Field of Search ............... 236/92 R, 92 A, 80 R, 236/80 F, 32, 33; 251/77, 78, 321, 337; 267/158, 164

[56] References Cited
U.S. PATENT DOCUMENTS

| 798,386 | 8/1905 | Baker | 251/321 X |
|---|---|---|---|
| 3,029,026 | 4/1962 | Eskin | 236/32 |
| 3,259,316 | 7/1966 | Wright et al. | 236/92 A |
| 3,304,002 | 2/1967 | Grayson | 236/92 A |
| 3,307,785 | 3/1967 | Currie | 236/80 R |
| 3,354,901 | 11/1967 | Dietiker et al. | 137/495 |
| 3,451,421 | 6/1969 | Vicenzi et al. | 236/92 R X |
| 3,453,903 | 7/1969 | Clifford | 236/80 R X |

Primary Examiner—William F. O'Dea
Assistant Examiner—William E. Tapolcai, Jr.
Attorney, Agent, or Firm—Clyde C. Blinn; Henry L. Hanson

[57] ABSTRACT

A pressure regulator has a diaphragm controlled valve and a temperature responsive means for adjusting the loading on the diaphragm to provide a pressure control from a maximum pressure to a minimum pressure in a modulating manner as the temperature changes. The temperature responsive means operates a lever for varying the spring loading on the diaphragm which is accomplished by a resilient biased pin and a C-shaped spring so that when the pin is lifted by the lever to reduce the force on the C spring, the C spring provides for a broadening of the force on the diaphragm and thus widening the modulation range of pressure for a given range in temperature.

6 Claims, 2 Drawing Figures

PRESSURE REGULATOR

BACKGROUND AND SUMMARY OF THE INVENTION

While pressure regulators are old and regulators providing a modulation of the pressure over a given temperature range are old, there is a continuous need for an improved pressure regulator for providing a maximum pressure at some predetermined temperature and a minimum pressure at another predetermined temperature with a broad range of temperature in which the pressure is modulated between the maximum and minimum pressures. The present invention is concerned with a pressure regulator having a diaphragm controlled valve which is loaded by an adjustable resilient member and a C-shaped spring member for providing a maximum pressure. As the loading of the adjustable resilient member is removed by a temperature responsive lever means, the C-shaped spring means provides a broad range of temperature in which the pressure is modulated. Gas valves of this kind, for instance, are used for controlling the burner in heating systems and water heaters. Since one intends to reduce the gas volume to a boiler or a water heater, an as exact as possible control by the gas control valve is required for avoiding overheating of the water because of safety reasons and also because of saving energy. This objective is difficult to achieve with valves which switch the burner on and off depending on the demand. For this purpose, a modulating gas valve is required which starts reducing the gas supply during the heating process before the setpoint temperature of the water is reached. By reducing the energy supply when approaching the setpoint temperature, a short term overheating is avoided. On the other side, care must be taken that when switching on the system, the burner immediately is operated with the maximum permitted gas pressure in order to heat up the water as quickly as possible. The invention provides a pressure regulator in which the intermediate range between maximum pressure and minimum pressure extends over a broader temperature range, that is, a broader proportional band. The invention as shown in the drawing of which FIG. 1 is a cross sectional view of the pressure regulator, and FIG. 2 is a graphical representation of the pressure and temperature operation of the pressure regulator.

DESCRIPTION OF THE INVENTION

Figure 2:
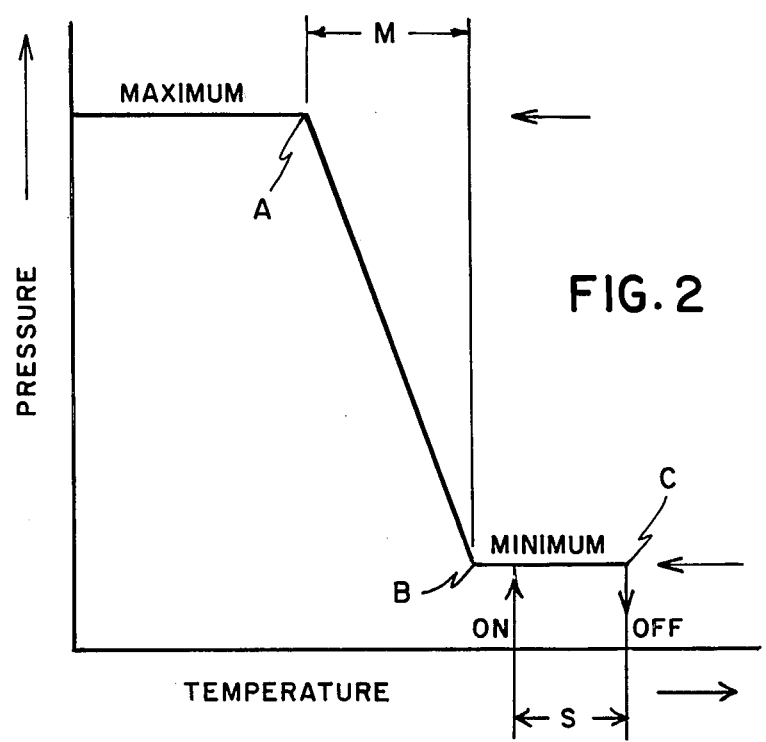

Referring to FIG. 1 the thermostatic pressure regulator controls the pressure in chamber 1 below the valve seat 2 by connecting the chamber 3 above the valve seat to an outlet channel 4. Valve member 5 of the pressure regulator controls the pressure in chamber 1 by exhausting the gas to the outlet 4. By controlling the pressure in chamber 1 a main valve member of a conventional type is adjusted by the varying pressure. Such a valve is disclosed in the Paul Dietiker et al U.S. Pat. No. 3,354,901 issued Nov. 28, 1967. The thermostatic pressure regulator shown in FIG. 1 consists essentially of three portions, a thermostat portion 6, a pressure regulator 7 and an over temperature or limit switch 8. These portions are connected by a transmission lever 10 which is pivoted or tiltably connected about a stationary axis 9 attached to the base of the pressure regulator. Thermostatic portion 6 has a diaphragm capsule 17 with a diaphragm plate 18 and a spring 19 which is placed between the diaphragm plate and base to urge the diaphragm plate upward. Attached to the diaphragm plate is a pin 20 which contacts the left end of lever 10. Connected to the diaphragm capsule 17 is a bulb 16 which is made of a conventional liquid filled system including the bulb 16, a capillary tube 14 and the diaphragm capsule 17 so that upon an increase in temperature of bulb 16 a downward movement of pin 20 takes place. The control temperature of thermostat 6 is adjusted by knob 22.

Valve member 5 cooperating with the valve seat 2 is connected to a circular diaphragm assembly 25 to which the pressure in chamber 3 on the under side of the diaphragm exerts an upward force to lift valve member 5 off of seat 2 and thus exhausts gas from chamber 1. Diaphragm assembly 25 is made up for an actual diaphragm 26 which is clamped between the base and a connector plate 28 by means of a thickened outer edge. A loading is placed on the diaphragm by a first spring 30 attached to the base at one end and has its free end connected to a second C-shaped spring 29 which has one end connected to the diaphragm so the force of spring 30 is against the diaphragm through spring 29.

A pin 35 which is threaded in sleeve 38 is biased downward by a coil spring 46 positioned between an adjustable threaded piece 41 in the base and sleeve 38, so that the sleeve and thus pin 35 provides a downward force on the free end of spring 30 and thus diaphragm assembly 25. The upper free end 40 of pin 35 projects through the smooth bore of member 41 so that the adjustment of the regulator pin 35 with respect to sleeve 38 can be accomplished when a cap of the regulator is removed. The cap provides for access to the adjusting member 41 and pin end 40 for adjustment.

A pin or adjusting member 32 which is threaded into the base provides a force on spring 30 for adjusting the minimum pressure setting to be explained later. A snap acting switch 51 has a plunger 50 which is engaged by a spring blade 49 attached to lever 10 for providing an electric switch limit when the temperature exceeds some predetermined position and the lever is moved upward to some position.

OPERATION OF THE INVENTION

The thermostatic pressure regulator as shown in FIG. 1 provides for a range of pressure as the temperature varies as shown in the graphical representation of FIG. 2. A maximum pressure is selected by the position of member 41 and thus the loading on the spring 46 against pin 35. A minimum pressure is selected by the loading on spring 30 by member 32 so that as the temperature varies at bulb 16, the pressure in chamber 1 is varied from the maximum through a modulating range to the minimum and thus an associated valve is controlled.

If the temperature measured by the sensor 16 is very low, when the system is switched on, spring 19 is pressing diaphragm capsule 17 together as much as possible and the pin is in the upward position. In this condition lever 10 does not transmit a force to switch 51 or to the sleeve 38. The threaded pin 35 is pressed under the full tension of the spring 46 in a direction against the C-shaped spring 29 and the diaphragm 25 to close valve member 5 against the seat 2. The control pressure in chamber 1 is at the maximum as shown in the graphical representation of FIG. 2.

With the gas supply to the main burner of furnace, not shown, the temperature measured by bulb 16 increases so that as the fluid in the system expands the diaphragm capsule 17 pin 20 moves downward to pivot lever 10 counterclockwise. As long as the course of movement of the lever does not engage the lower end of bushing 38, the maximum gas pressure remains up to the temperature represented by the point A in FIG. 2. As soon as a further increase in temperature causes lever 10 to start to press against the lower end of sleeve 38, the force acting on spring 29 and to the diaphragm is reduced and the gas pressure maintained by valve 5 engaging seat 2 begins to decrease. With the auxiliary spring 29, the modulation of pressure in the range shown on the graph as M is broadened so that with an increasing temperature, the gas supply is more and more reduced. The stiffer the auxiliary spring 29, the steeper the curve falls between point A and B to the temperature range M. By a suitable selection of the spring constant of the auxiliary spring 29, a desired proportional band can be attained.

With the temperature increasing further, lever 10 finally lifts pin 35 off of the spring 30 at point B on the curve of FIG. 2. Thus the spring adjustment of spring 30 by member 32 determines the minimum control pressure of the pressure regulator.

Normally the temperature does not reach the high limit valve at point C to operate the switch 51; however, if the high limit is reached and the temperature of bulb 16 must drop. The drop in temperature is indicated at S before the switch 51 will again switch back on and allow the regulator to maintain the minimum pressure. Obviously the limit switch could be accomplished by other types of limit and the manner in which the limit switch is connected into the electrical circuit of the valve to which this pressure regulator is to be used would be obvious to one skilled in the art.

The embodiments of the invention in which an exclusive property or right is claimed are defined as follows:

1. A pressure regulator for a gas supply which has a pressure output varying over a range of temperature comprising:
    a base member,
    a chamber with said base member having an inlet and outlet connected to furnish gas having a predetermined pressure, said chamber having a diaphragm on one side, said diaphragm being connected to control a valve in said inlet, said valve being opened when gas pressure increases in said chamber,
    adjustable resilient member for applying a force,
    spring means connecting said resilient member to said diaphragm on the opposite side of said chamber to apply a force to said diaphragm whereby the pressure of the gas at said outlet is selected by the position of said adjustable member, and
    temperature responsive means connected to said adjustable resilient member for changing said force and thus modifying the gas pressure at said outlet as temperature changes,
    said spring means comprises a first blade spring having one end attached to the base and the second end moveable freely, and a second spring having one end attached to the diaphragm and the other end engaging the free end of said first spring
    said adjustable resilient member comprises a pin support by said base and having one end engaging the upper surface of the free end of said first spring, and a coil spring surrounding said pin and having one end attached to an adjustable screw member in said base and the other end attached to said pin for biasing said pin downward against the free end of said first spring, and
    said adjustable screw member providing a means to select the maximum pressure maintained by the pressure regulator.

2. The invention of claim 1 wherein
    said temperature responsive means comprises a lever pivoted about said base and connected to an expandable member for pivoting said lever upon an increase in temperature, said lever being connected to said pin for applying an upward force against said coil spring upon an increase in temperature for reducing the force applied to the upper side of said diaphragm as the temperature of said temperature responsive means increases.

3. The invention of claim 2 wherein said first spring is adjusted by an adjusting pin attached to said base for applying a downward force to move the free end of said first spring towards said diaphragm to select the minimum pressure maintained by the pressure regulator.

4. The invention of claim 3 wherein said lever has means for actuating a high limit switch when said lever moves to a predetermined position.

5. The invention of claim 3 wherein said second spring is a C-shaped spring blade with a free end of the C-shape attached to the diaphragm and a free end contacting said first spring for broadening the modulating range between the minimum and maximum pressure of the pressure regulator.

6. A pressure regulator for a gas supply which has a pressure output varying over a range of temperature comprising:
    a base member,
    a chamber with said base member having an inlet and outlet connected to furnish gas having a predetermined pressure, said chamber having a diaphragm on one side, said diaphragm being connected to control a valve in said inlet, said valve being opened when gas pressure increases in said chamber,
    adjustable resilient member for applying a force,
    spring means connecting said resilient member to said diaphragm on the opposite side of said chamber to apply a force to said diaphragm whereby the pressure of the gas at said outlet is selected by the position of said adjustable member, and
    temperature responsive means connected to said adjustable resilient member for changing said force and thus modifying the gas pressure at said outlet as temperature changes,
    said spring means is a C-shaped spring blade positioned between said adjustable resilient member and said diaphragm to apply a force to close said valve whereby upon said resilient member being moved upward by said temperature responsive means, said C-shaped spring provides a wider modulation range of pressure change versus temperature change.

* * * * *